E. D. HANSEN & G. G. F. C. WINKLER.
CENTRIFUGAL FROTH SUPPRESSOR.
APPLICATION FILED DEC. 11, 1911.
1,031,441.
Patented July 2, 1912.
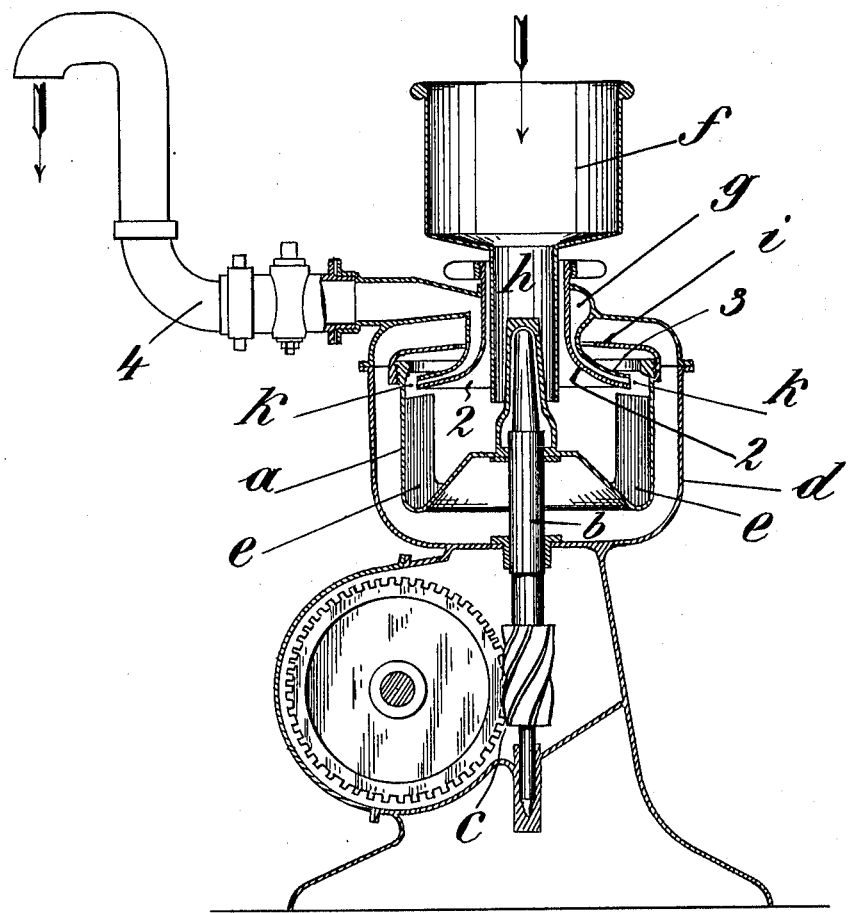

UNITED STATES PATENT OFFICE.

EDUARD DANIEL HANSEN, OF HAMBURG, GERMANY, AND GUSTAV GOTLIEB FREDERIK CHRISTIAN WINKLER, OF ODENSE, DENMARK, ASSIGNORS TO BERGEDORFER EISENWERK AKTIENGESELLSCHAFT, OF SANDE, NEAR BERGEDORF, GERMANY.

CENTRIFUGAL FROTH-SUPPRESSOR.

1,031,441.   Specification of Letters Patent.   Patented July 2, 1912.

Application filed December 11, 1911. Serial No. 665,120.

*To all whom it may concern:*

Be it known that we, EDUARD DANIEL HANSEN and GUSTAV GOTLIEB FREDERIK CHRISTIAN WINKLER, subjects of the King of Denmark, and residents of 16 Breckelbaumspark, Hamburg, Germany, and 21 Jörgensgade, Odense, Denmark, respectively, have invented certain new and useful Improvements in Centrifugal Froth-Suppressors, of which the following is a specification.

When milk is treated in a separator or a pasteurizing apparatus the milk will froth much while running off. This frothing will not only prevent the milk being immediately treated further, but much milk will also be lost by being sprayed and spattered about. For meeting this trouble froth suppressors have been employed, which have the object of breaking the air bubbles in the fluid, so that the milk will flow off quietly and free of froth. Such froth suppressors mostly consist of a horizontal rapidly revolving drum, into which the milk is introduced for being submitted to the action of the centrifugal force. The spout of the drum is constructed in such a manner that only non-frothy milk can flow off and the froth itself will be retained for the purpose of being completely suppressed by the action of the centrifugal force. For practical purposes it is, however, of much more advantage to arrange the froth suppressor vertically, for the reason that a much smoother run will be thereby insured. Besides the vertical suppressor will be much more steady.

In the accompanying drawing a froth suppressor of the hereinbefore described character is exemplified in a diagrammatical manner and to the greater part in a longitudinal section.

In this drawing $a$ is the rotary drum or bowl mounted on the spindle $b$. The latter is rotated at a high speed by means of a gear $c$. The bowl $a$ is surrounded by a stationary casing for the purpose of protecting it against contact from outside and of avoiding the fluid being spattered about and lost. The upper end of this casing has an annular chamber $g$, from which extend two funnel shaped walls 2 and 3. The latter are concentrically arranged around each other leaving a narrow space only between them. Their diameters at their mouths are so large, that they will reach almost up to the shell of the bowl. On the bowl is bolted a lid $i$, which has the object of retaining the froth. In the bowl are provided vanes $e$. From the said annular chamber is branched off the pipe 4 for the discharge of the defrothed milk. The milk supply pipe $h$ of the supply vessel $f$ above it, passes through the annular chamber.

The milk to be defrothed is introduced into the vessel $f$ whence it flows through the short pipe $h$ into the interior of the bowl $a$. Here it is seized by the vanes $e$ and made to rotate at a high speed together with the bowl, so that it will be forcibly pressed against the shell of the bowl. The bubbles of air will in consequence thereof burst or will have to recede toward the inside of the bowl. The milk which has become free of froth will pass at the periphery of the funnel shaped walls 2 and 3 into the narrow chamber $k$ between them, thence into the annular chamber $g$ and finally into the discharge pipe 4. In consequence of the fact that the mouth of chamber $k$ is farther from the axis of the bowl than the opening through the lid $i$, only milk which is free of froth can enter into said chamber $k$. Because of the centrifugal action, the layer of milk along the wall of the bowl is under pressure. As the funnel-shaped plates are stationary, the milk particles which flow into the space between the plates gradually lose their velocity, and correspondingly cease to be under pressure. As the successive milk particles are driven to the periphery of the drum and submitted to the full pressure, they have a tendency to move toward the region of lower pressure between the walls 2, 3, so that the milk is positively forced into and through the tube 4 without the use of a pump or other forcing means, as has been shown in the actual use of the device.

We claim:

A centrifugal froth suppressor comprising a bowl mounted on a vertical axis, and having inwardly extending vanes, a stationary liquid discharging device consisting of two separated annular concentrically arranged walls extending into the bowl and into proximity to the wall thereof and a milk supply pipe extending into the bowl through the discharging device.

The foregoing specification signed at Hamburg, Germany, this 25th day of November 1911.

EDUARD DANIEL HANSEN.
GUSTAV GOTLIEB FREDERIK
    CHRISTIAN WINKLER.

In presence of—
    ERNEST H. L. MUMMENHOFF,
    IDA CHRIST. HAFERMANN.

Copies of this patent may be obtained for five cents each, by addressing the "Commissioner of Patents, Washington, D. C."